Aug. 4, 1942.  T. A. DICKS  2,291,953
CONTROLLABLE PROPELLER
Filed Oct. 14, 1940  4 Sheets-Sheet 1

Inventor
Thomas A. Dicks
By Raymond W. Colton
Attorney

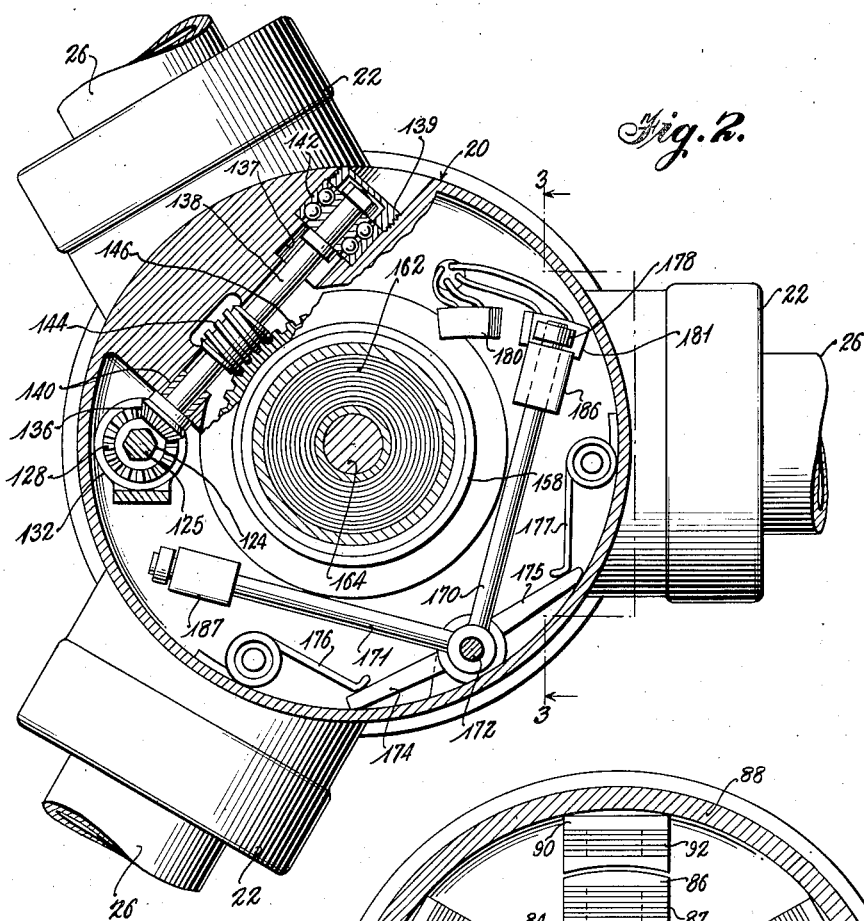
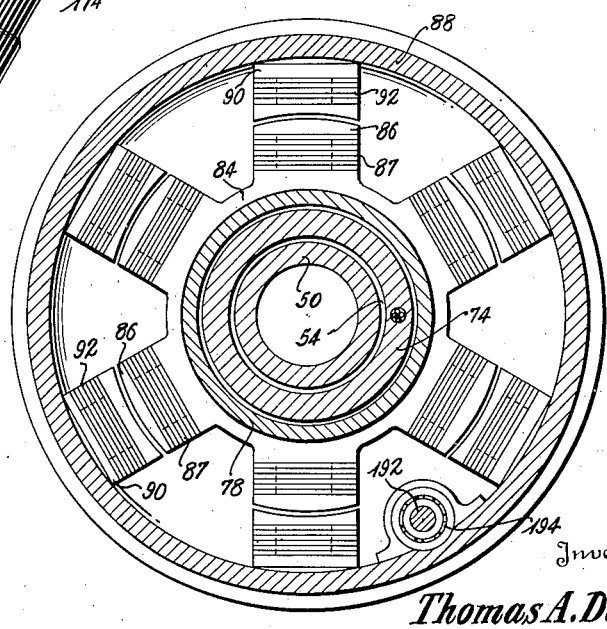

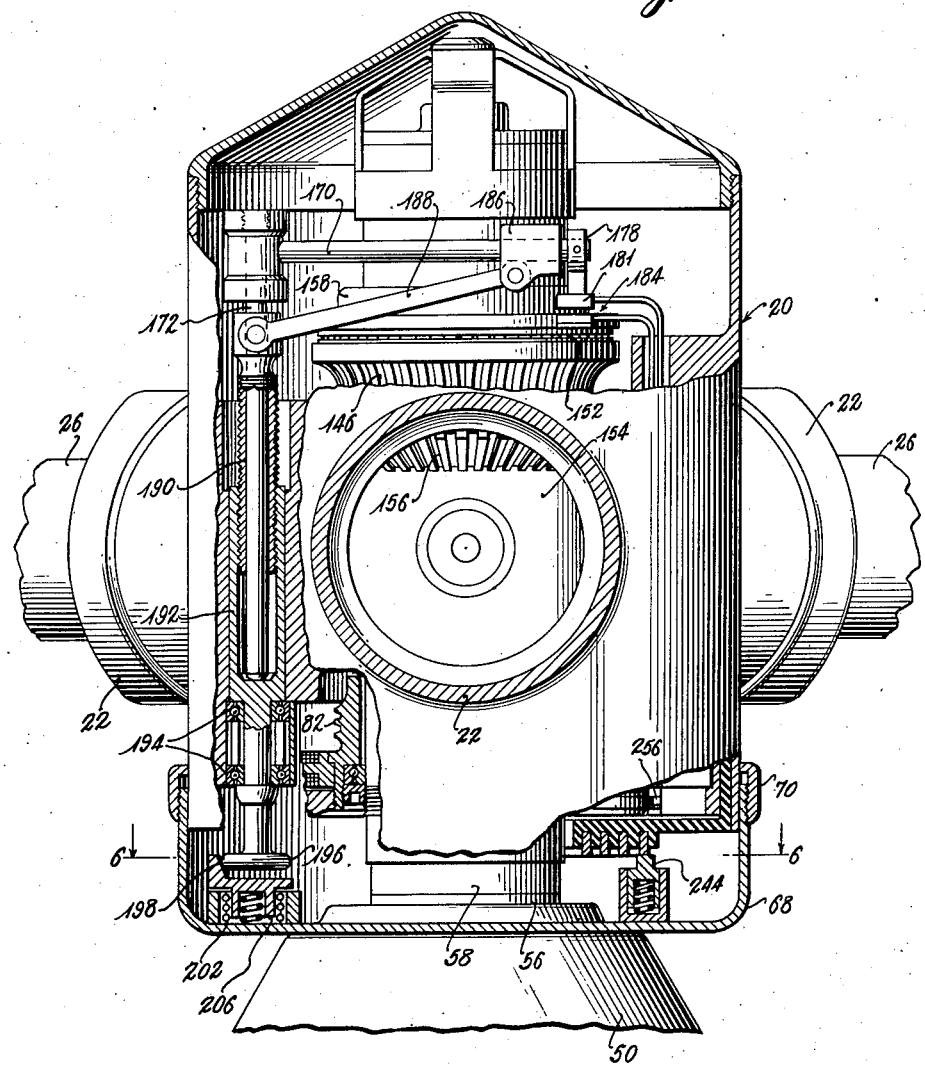

Aug. 4, 1942. T. A. DICKS 2,291,953
CONTROLLABLE PROPELLER
Filed Oct. 14, 1940 4 Sheets-Sheet 4
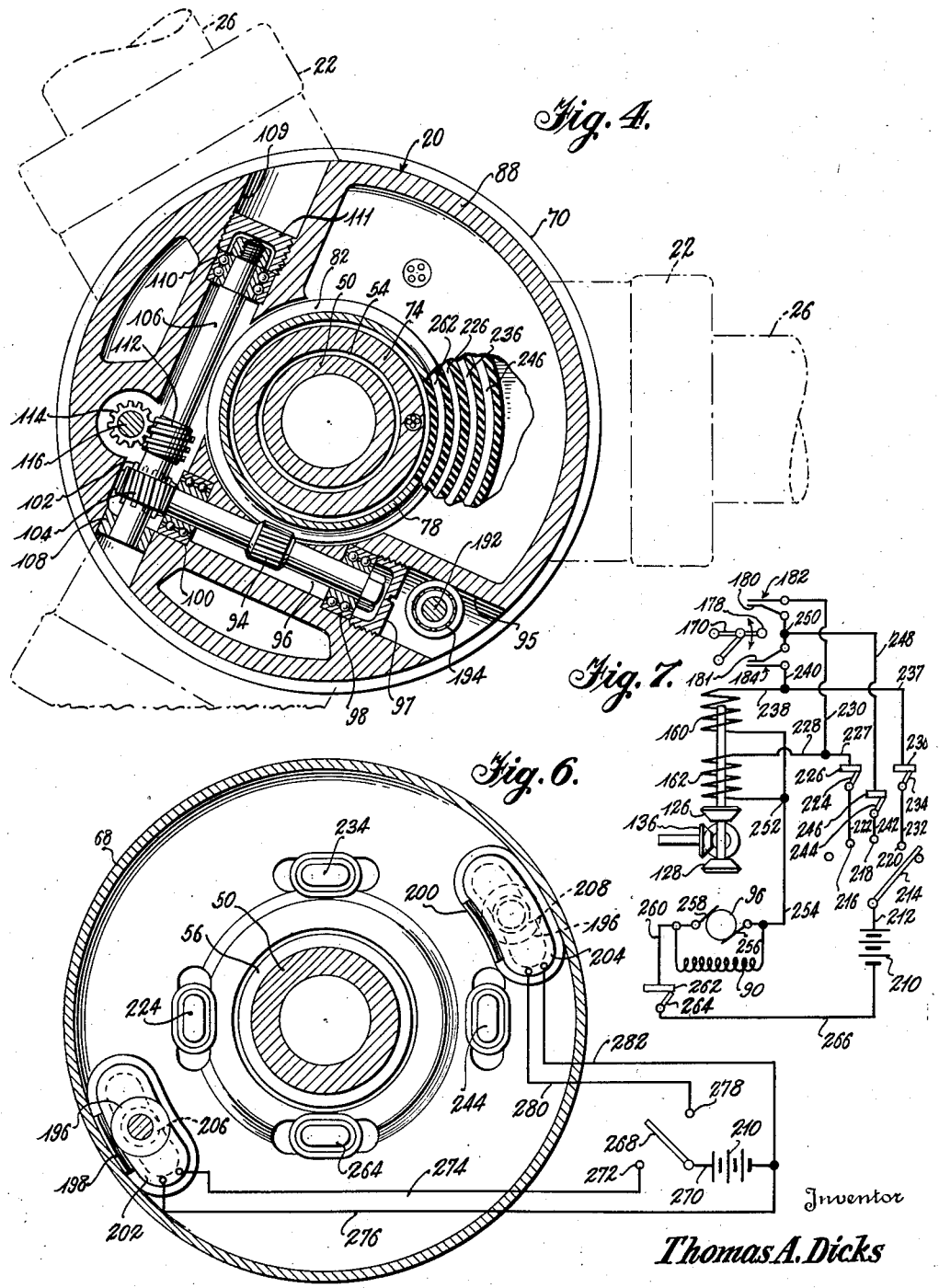
Inventor
Thomas A. Dicks
By Raymond W Colton
Attorney Patented Aug. 4, 1942

2,291,953

UNITED STATES PATENT OFFICE 2,291,953

CONTROLLABLE PROPELLER

Thomas A. Dicks, Pittsburgh, Pa.

Application October 14, 1940, Serial No. 361,155

14 Claims. (Cl. 170—163)

This invention relates to controllable pitch propellers, primarily intended for use in the aircraft field.

A number of constructions have been proposed and utilized previously wherein it has been rendered possible to adjust the pitch of the blades automatically as a function of engine speed, thereby tending to maintain such speed substantially constant or within predetermined limits. Other recent advances in aviation have rendered it desirable not only to approximate constant engine speed under certain conditions, but likewise to provide means for varying the predetermined limits or constant speed while the engine is in operation. In other words, it may be desirable under certain atmospheric conditions and/or at certain elevations to set a controllable pitch propeller while in flight for maintaining the engine speed substantially constant. Under these circumstances, a speed responsive element, as in known constructions, will cause shifting of the blade pitch as the engine speed tends to increase or decrease with respect to the preselected substantially constant speed. But for another set of atmospheric conditions and/or another altitude, it is often the case that the desired substantially constant engine speed would be something different from the first. For example, perhaps more efficient operation would occur at a somewhat higher engine speed than the first. Accordingly, it is desirable to provide some means for varying the setting so as to modify the limits of the engine speed to be maintained.

The present invention relates to a controllable pitch propeller possessing constant speed and full feathering characteristics and endeavors to supply the deficiencies of devices of this class heretofore known in the art. The device of the present invention includes a hub supporting a plurality of blades, speed responsive means to vary the pitch of the blades when a predetermined propeller speed is attained and means controllable from a point without the hub for setting or adjusting the predetermined speed at which operation of the speed responsive means becomes effective. The speed responsive means may comprise a centrifugal governor carried by the hub, movements of which control one or more circuits of an electromagnetic means, which in turn effects variation of the blade pitch. As the engine speed increases with respect to the desired predetermined constant speed, movement of the speed responsive means will be in such a direction as to increase the pitch of the blades. Conversely, as the engine speed diminishes below the desired predetermined speed, the blade pitch will be decreased. The direction in which the blades are rotated in their sockets during a change in pitch may be controlled by a reversing gear, which may also be electromagnetically actuated by a circuit or circuits cooperating with the driving instrumentality which actually rotates the blades about their axes. This driving instrumentality may assume the form of an electric motor entirely carried by the hub, which motor may have a stator fixed to a portion of the hub and therefore rotating at the speed of the hub. A rotor may be rotatably mounted with respect to the hub so that its speed may differ from that of the hub, thereby promoting relative movement for driving the blades to change their pitch. By having the motor entirely carried by the hub, it will follow that the pitch of the blades can be varied whether the hub is rotating or not.

The driving connections interposed between the motor and the blades may assume the form of a plurality of worms and worm wheels connected in series, thereby reducing the speed with a corresponding increase in mechanical advantage.

The manner of adjusting the governor so that it will operate at different rotational speeds may be by shifting a weight along a governor arm so that the distance of the weight from the center of rotation of the hub is varied, thus responding at different rotational speeds. The governor may be biased towards its inner position by means of a spring, which will also tend to restore it to its inner position when rotational speeds are reduced to a point where the force of the spring overbalances centrifugal force. The weight may be shifted along the governor arm by the adjustment of cooperating screw threaded sleeves, which may be moved to extended or contracted positions, depending upon the direction of their relative rotation. The rotation of one of these sleeves with respect to the other may be accomplished by gearing selectively engageable to effect rotation in either direction. One way of accomplishing this result is by having a friction disk projecting from the rotating hub towards the stationary parts of the mechanism carried by the nose plate of the plane. Engageable with this friction disk there may be provided a pair of cooperating elements adapted to engage the inner and outer portions of the disk respectively and driving it in opposite directions. These elements may be electromagnetically projected into the path of the disk, selectively from a point outside of the hub, preferably from the cockpit of the airplane.

It is believed that a clearer understanding of the present invention will follow from a detailed description of the accompanying drawings wherein:

Fig. 2 is a sectional plan taken along line 2—2 of Fig. 1;

Fig. 3 is an elevation, partially in section, taken substantially along line 3—3 of Fig. 2, partially broken away to depict details;

Fig. 4 is a plan taken substantially along 4—4 of Fig. 1;

Fig. 5 is a sectional plan, taken along line 5—5 of Fig. 1;

Fig. 6 is a sectional plan of the nose piece taken along line 6—6 of Fig. 3 showing a somewhat diagrammatic view of some of the control elements and their electrical connections; and Fig. 7 is a circuit diagram showing electrical connections for certain of the control elements.

Figure 1:
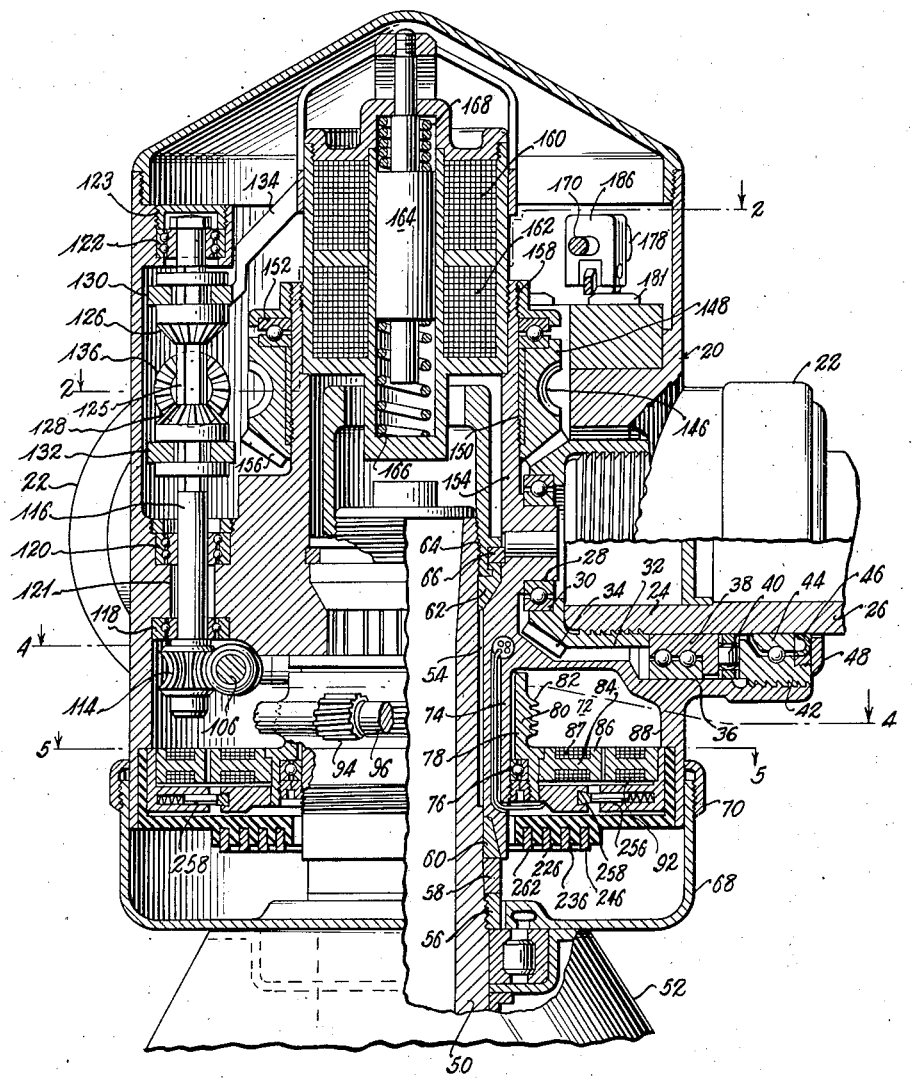
Fig. 1 is an elevation, partly in section and partly broken away, of a construction embodying the present invention.

A propeller hub generally indicated by the reference character 20 is provided with three blade sockets 22, each of which is adapted for the reception of the root ends 24 of the blades 26. As clearly shown in Fig. 1 of the drawings, the body of the hub is provided with a shoulder at the base of each socket to define a seat 28 for the reception of a bearing 30. The bearing 30 rotatably supports a sleeve 32 threaded on the root end of each blade, each sleeve terminating in a bevel gear 34 through which rotation of the blades about their axes for adjustment of pitch is effected. Each socket is also shown as stepped to provide an enlarged seat 36 for the reception of bearings 38 and thrust bearing 40, interposed between the elements of bearing 38 and a retainer 42 threadedly received in the outer end of the socket. Cooperating with the retainer 42 there is an additional bearing 44, pressure packing 46 and closure 48.

The usual engine shaft 50 projects through the nose 52 of the airplane into the central bore of the hub 20 to which it is non-rotatably attached by means of splines 54 and the customary bearing nut 56, collar 58, cone 60, split cone 62, bearing nut 64 and positioning ring 66.

The end of the hub adjacent the nose of the ship is assembled thereon by means of a nose plate 68 and threaded cap 70. This lower end of the hub as shown in Fig. 1, is provided with a counter bore 72 for the reception of a portion of the control mechanism. Rotatably mounted on the inner wall 74 of the hub defined by the counter bore and supported upon one or more suitable bearings 76, there is provided an annular element 78 having a substantially cylindrical portion 80, provided on its periphery with a worm thread 82. This annular element is also provided with a flanged or circumferential portion 84, constituting in effect the rotor of an electrical machine. This circumferential portion may assume the form of a spider presenting a plurality of spaced poles 86, having windings 87, which are clearly depicted in Fig. 5 of the drawings. The outer wall 88 of the hub defined by the counter bore 72, suitably supports by means of bolts or the like, radially projecting elements 90 carrying a suitable winding or windings 92 to constitute what is in effect the stator of an electrical machine.

The structure thus far defined is quite similar to that disclosed in the copending application, Serial Number 139,795, filed April 29, 1937, by the present inventor. The construction to be described from this point on will differ from that of the previous application referred to in details, but it will be appreciated that many of the features of each could be transposed to the other. Likewise, it will be understood that the specific driving mechanism and specific details of parts of the control mechanism of the present invention could be replaced by equivalent mechanism or elements whether already known in the art or to be proposed.

A portion of the driving mechanism to be described, will resemble in some respects, constructions previously disclosed in the art, such as by the British patent to Russell, 136,003, filed in 1919, and the French patent to Haw, No. 819,581, published on October 21, 1937, with which of course, the present inventor is quite familiar.

The worm threads 82 carried by the annular member 78 engage the teeth of a worm wheel or pinion 94 carried by a shaft 96, which shaft is rotatably received in bearings 98 and 100 in the manner depicted in Fig. 4 of the drawings. The shaft 96 is received in a traverse bore 95 formed in the hub body and retained by aid of a threaded cap 97. An end of the shaft 96 is provided with a worm 102, which in turn engages a pinion 104 carried by a shaft 106 at right angles to shaft 96 and located immediately thereabove. This shaft 106 is received rotatably in suitable bearings 108 and 110 and it is likewise received in a transverse bore 109 formed in the hub body and retained therein by a threaded cap 111. The shaft 106 carries a worm 112 intermediate its ends for cooperation with a worm wheel or pinion 114 carried by a shaft 116 mounted in bearings 118, 120 and 122 for rotation about an axis substantially parallel to the axis of the engine shaft. Thus the axes of the shafts 96 and 106 are perpendicular to one another and to the axis of the engine shaft while the axis of shaft 116 is substantially parallel to that of the engine shaft. The shaft 116 is received in an axial bore 121 and is retained in its operative position by aid of a threaded cap 123.

Intermediate one of its lower bearings 120 and its upper bearing 122 as depicted in Fig. 1 of the drawings, the shaft 116 is provided with a non-circular portion 125, which may be hexagonal in cross section as shown in Fig. 2 of the drawings. Slidably received on this non-circular portion 125 and provided with sockets 124 complementary thereto, so as to be axially movable thereon but not rotatable with respect thereto, there are a pair of oppositely directed bevel gears 126 and 128 rotatably supported by arms 130 and 132 respectively carried by yoke 134. The bevel gears are mounted in the respective arms so as to be freely rotatable therein and capable of turning with the shaft 116 when motion is imparted thereto. These bevel gears are intended to selectively cooperate with a bevel gear 136 carried by a shaft 138 mounted in suitable bearings 140 and 142. This shaft 138 is received in a transverse bore 137 formed in the hub body and the bore is closed by a threaded cap 139. Intermediate the bearings, the shaft 138 carries a worm 144 which is in driving relationship with a worm wheel 146, carried by an annular element 148 rotatably supported by bearings 150 and 152 for rotation about the upper wall 154 of the hub. The lower end of the annular element 148, as viewed in Fig. 1 of the drawings is provided with a bevel gear 156 which is maintained in mesh with the bevel gears 34 of the projeller blades to be adjusted. The annular member 148 is retained in position by a nut 158 threaded on the hub and applied against the thrust bearing 152.

The bevel gears 126 and 128 are moved axially along the shaft 116 with the yoke 134, which is electromagnetically shifted by a pair of solenoids 160 and 162 received in a central bore formed near the outer end of the hub. The yoke 134 is rigidly connected with a core 164, normally centered by opposing springs 166 and 168, which core receives its movement in response to the magnetic flux set up by whichever of the solenoids is selectively energized. It will be clear from the drawings, Fig. 1, that when the upper solenoid 160 is energized, the core and its yoke will be raised in opposition to the spring 168, thereby lifting the bevel gear 128 into mesh with bevel gear 136. On the other hand, when the solenoid 162 is energized, the core 164 will be drawn into its field against the force of the spring 166, thereby moving the yoke and its bevel gear 126, into mesh with bevel gear 136.

Whereas provision has been made for manually controlling the energization of solenoids 160 and 162 as well as the motor, it is of course necessary in accordance with the present invention that their energization be controllable also automatically as a function of rotational speed of the hub. Accordingly, a centrifugal governor is provided near the upper or outer end of the hub and includes an arm 170 pivoted about a shaft 172 and having an angularly extending arm 174 engaged by a spring 176 tending to urge the free end of arm 170 towards the axis of the hub. The free end of the arm 170 carries a switching element 178 which selectively engages terminals 180 and 181 of switches 182 and 184, respectively, as the governor arm moves towards and from the hub axis during speed changes. Slidably and adjustably carried by the arm 170, there is provided a mass or weight 186 to which is pivotally attached a link 188, the opposite end of the link being also pivotally attached to the upper end of an axially movable threaded sleeve 190 which is not rotatable about its own axis, as clearly shown in Fig. 3 of the drawings. The sleeve 190 is journalled for axial movement on the shaft 172. An internally threaded sleeve 192 cooperatively receives the external threads of the sleeve 190, the lower end of the sleeve 192 being received in suitable bearings 194 to provide for rotation thereof and at the same time restrain it against axial movement. The lower end of the sleeve 192 carries a friction disk 196 which is selectively engageable with cooperating friction elements 198 and 200 carried by the nose plate 68 and projectable into the path of the friction disk by means of solenoids 202 and 204 and their cooperating cores 206 and 208 respectively. It will be clear that engagement between the friction element 198 and disk 196 will effect relative rotation of the threaded sleeves in one direction, whereas engagement between the element 200 and disk 196 will produce relative movement in the other direction. Thus by manipulation of the circuits controlling the solenoids 202 and 204, it will be clear that the position of the link 188 and accordingly, of the weight 186 with respect to governor arm 170, may be varied readily.

For balancing the governor system, a second arm 171 may be pivoted about the shaft 172 at an angle to the arm 170, and be provided with a mass 187 similar to and shiftable with the mass 186. The arm 171 may likewise have an angularly projecting arm 175, similar to the arm 174 and a spring 177 similar to the spring 176.

The electrical connections for controlling the mechanism may best be traced with reference to the circuit diagrams shown in Figs. 6 and 7 of the drawings. The source of energy depicted as a battery 210, carried in the fuselage, has one terminal thereof connected by a lead 212 to a switch arm 214 which may close a circuit through any one of three terminals, 216, 218 or 220. Terminal 216 is connected by a lead 222 with a brush 224, carried by the nose plate, which bears upon a collector ring 226 rotatably mounted in the hub. From the collector ring 226 there is a lead 227 connected to two branches, one of which is provided with a lead 228 connected to the winding of the solenoid 162. The other branch from lead 227 is connected through a lead 230 with one of the terminals of the switch 182. The terminal 220 with which the switch arm 214 may make contact, is provided with a lead 232 terminating in a brush 234, similar to brush 224, which bears upon collector ring 236 carried by the hub in a manner similar to that in which collector ring 226 is supported. The collector ring 236 is likewise connected by a lead 237 to a branched circuit, one branch of which is connected through lead 238 with one terminal of the winding of solenoid 160, the other branch being connected through a lead 240 with one terminal of the switch 184. The center terminal 218 with which switch arm 214 may be connected is provided with a lead 242 terminating in a brush 244, similar to brushes 224 and 234, which bears upon collector ring 246, mounted similarly to collector rings 226 and 236. A lead 248 connects the collector ring 246 with a terminal 250 common to terminals 180 and 181 of the switches 182 and 184.

The opposite ends of the solenoids 160 and 162 are connected to a common terminal 252, which through a lead 254 is connected with the motor comprising the field winding 90 and armature 96. Since the solenoids 160 and 162 are relatively stationary with respect to the field or stator 90, the connection between the lead 254 and the stator winding may be direct. The connection between the lead 254 and the rotor, on the other hand, is effected through a brush 256 which bears upon a commutator 258, depicted in Fig. 1. The comutator is provided with a second brush 258 connecting the rotor windings with the opposite end of the stator winding, for the parallel connected motor depicted in the drawings, and thence through a lead 260 to a collector ring 262 which is engaged by a brush 264 carried by the nose plate and this in turn, through a lead 266 is connected to the opposite terminal of the battery 210.

Another control switch is provided in the cockpit of the plane for effecting adjustment of the shiftable mass 186, and where used, the balancing mass 187. This control system comprises a switch arm 268 connected to a battery 210 which may be the same battery as employed for the other controls previously described, by the lead 270. The switch arm 268 may be moved into contact with a terminal 272 which is connected by a lead 274 to one end of the winding of solenoid 202, the opposite end of which is connected through a lead 276 to the opposite terminal of the battery 210. Similarly, the switch arm 268 may be brought into contact with a terminal 278, which is connected through a lead 280 with an end of the winding of solenoid 204, the opposite end of which is connected through a lead 282 to the opposite terminal of the battery 210.

To avoid confusion, there has been no attempt to depict the electrical connections in any of the figures except Figs. 6 and 7 of the drawings. It will be clear however, that the necessary leads may be passed through bores suitably formed in the hub between the operating parts.

When it is desired to modify the pitch of the blades manually in one direction, the switch arm 214 may be moved to contact terminal 216 whereupon current will flow from the battery 210 through the lead 212, switch arm 214, terminal 216, lead 222, brush 224, collector ring 226, lead 227, lead 228, solenoid 162, terminal 252, lead 254, through the motor windings, lead 260, collector ring 262, brush 264, and return to the battery through lead 266. This energization of solenoid 162 will pull the plunger 164 downwardly, resulting in engagement between bevel gears 126 and 136. At the same time, relative rotation between the rotor and stator of the motor will result in rotation of the shaft 116, which will in turn, through the driving mechanism previously described, modify the pitch of the blades in the desired direction.

Where manual control to change the pitch of the blades in the other direction is desired, the switch arm 214 may be brought into contact with terminal 220, whereupon current will flow from the battery 210, through the lead 212 and switch arm 214 to terminal 220, thence through lead 232, brush 234, collector ring 236, lead 237, lead 238, solenoid 160, terminal 252, lead 254, the motor windings, lead 260, collector ring 262, brush 264, and return through lead 266 to the battery. In a similar manner, this will energize the solenoid 160, drawing the armature 164 into its field and bringing about engagement between bevel gears 128 and 136 which are depicted in this position in Fig. 1 of the drawings. Simultaneously, relative rotation between the rotor and stator will effect a change of pitch in this opposite desired direction. The pitch will continue to change in the desired direction so long as the switch arm 214 is retained in contact with the selected terminal 216 or 220, or until the blades have shifted to any limiting position which might be assigned to them.

Where automatic control of the pitch is desired, the switch arm 214 will be brought into contact with its terminal 218. Under these circumstances, current will flow from the battery 210 through lead 212 and switch arm 214, terminal 218, lead 242, brush 244, collector ring 246, lead 248, and common terminal 250. In the event that the contactor 178 carried by the centrifugally actuated arm 170 is in a mid-position such as depicted in Fig. 7 of the drawings, the circuit will be broken at the switches 182 and 184. Assuming that the arm 170 has moved to its extreme counterclockwise position, then the switch 182 will be closed and current will pass therethrough from the common terminal 250, thence through the lead 230, lead 228, solenoid 162, terminal 252, lead 254, through the motor windings, lead 260, collector ring 262, brush 264, lead 266, and return to the battery 210. Assuming that the arm 170 has been moved to its limiting clockwise position, the switch 184 will be closed and current will flow from the common terminal 250, through the switch 184, lead 240, lead 238, solenoid 160, common terminal 252, lead 254, the motor windings, lead 260, collector ring 262, brush 264, lead 266 and return to the battery 210. Thus it will be seen that when the automatic circuits are in operation, the manual circuits are broken and in this way, the two systems employ the same solenoids and motor.

Where it is desired to change the position of the mass 186 so as to impose different limits of pitch for the automatic operation, the switch arm 268 may be brought into selective contact with terminals 272 or 278 to move the desired friction element 198 or 200 into engagement with the disk 196, causing it to rotate in the desired direction. From the description of the structure, it will be clear that the distance of the mass 186 may be shifted towards and away from the axis of the shaft 172 while the propeller shaft is rotating.

It will be clearly understood that a manual modification of the blade pitch may be effected whether the propeller shaft is rotating or at rest. The position of the mass 186 on the other hand, may be modified only while the propeller shaft is rotating.

The appended claims have been framed to express the invention in a manner readable upon the detailed structure described in the foregoing, but they are not necessarily limited thereto.

I claim:

1. A controllable pitch propeller comprising a hub supporting a plurality of blades, electromagnetic means carried by said hub to vary the pitch of said blades responsive to a predetermined propeller speed, and means including electromagnetic means carried by said hub but controllable and adjustable from a point outside of said hub for setting the predetermined speed for response of said electromagnetic means.

2. A controllable pitch propeller comprising a hub supporting a plurality of blades, electromagnetic means for adjusting said blades and speed responsive means carried by said hub cooperating with said electromagnetic means to vary the pitch of said blades upon attainment of a predetermined propeller speed, and electromagnetic means carried by said hub but controllable and adjustable from a point outside of said hub for setting the predetermined speed for operation of said speed responsive means.

3. A controllable pitch propeller comprising a hub supporting a plurality of blades, electromagnetic means carried by said hub to vary the pitch of said blades, governor means carried by said hub for closing a circuit to said electromagnetic means upon attainment of a predetermined propeller speed, and means including an electromagnet controllable and adjustable from a point outside of said hub while said hub is rotating for setting the predetermined speed at which closure of said circuit is effected by said governor means.

4. A controllable pitch propeller comprising a hub supporting a plurality of blades, electromagnetic means carried by said hub to vary the pitch of said blades, centrifugal governor means carried by said hub to control operation of said electromagnetic means upon attainment of a predetermined propeller speed, and means carried by said hub comprising an electromagnet controllable and adjustable from a point outside of said hub for setting the predetermined speed for operation of said governor means.

5. A controllable pitch propeller comprising a hub supporting a plurality of blades, an electric motor carried by said hub, speed responsive means carried by said hub and cooperating with said motor to vary the pitch of said blades upon attainment of a predetermined propeller speed, and electromagnetic means carried by said hub and controllable from a point outside of said hub for setting the predetermined speed for operation of said speed responsive means.

6. A controllable pitch propeller comprising a hub supporting a plurality of blades, electromagnetic means and governor means carried by said hub for automatically controlling the pitch of said blades as a function of propeller speed, and selectively engageable frictional driving means carried by said hub but operable from a point outside of said hub for adjusting said governor means to operate at various propeller speeds.

7. A controllable pitch propeller comprising a hub supporting a plurality of blades, governor means carried by said hub for automatically controlling the ptch of said blades as a function of propeller speed, said governor means having a pivoted arm and a weight adjustably carried by said arm, and electromagnetic means carried by said hub and controllable from a point outside of said hub for adjusting said weight with respect to said arm to set said governor for operation at various propeller speeds.

8. A controllable pitch propeller comprising a hub supporting a plurality of blades, electromagnetic means carried by said hub for varying the pitch of said blades, a circuit for said electromagnetic means, governor means carried by said hub for automatically opening and closing said circuit as a function of propeller speed, and electromagnetic means carried by said hub controllable and adjustable from a point outside of said hub for setting a predetermined speed a which said governor means modifies said circuit.

9. A controllable pitch propeller comprising a hub supporting a plurality of blades, electromagnetic means carried by said hub for varying the pitch of said blades, circuits for said electromagnetic means, governor means carried by said hub for automatically opening and closing said circuits at predetermined propeller speeds, and electromagnetic means carried by said hub controllable and adjustable from a point outside of said hub for setting predetermined speeds at which said governor modifies said circuits.

10. A controllable pitch propeller comprising a hub supporting a plurality of blades, an electric motor carried by said hub for varying the pitch of said blades, speed responsive means carried by said hub to control the operation of said motor at a predetermined propeller speed, and electromagnetic means carried by said hub electrically connected with a point outside of said hub for setting the predetermined speed for operation of said speed responsive means.

11. A controllable pitch propeller comprising a hub supporting a plurality of blades, an electric motor carried by said hub for varying the pitch of said blades, a circuit for said motor, speed responsive means carried by said hub for automatically opening and closing said circuit as a function of propeller speed, and an electromagnet carried by said hub controllable and adjustable from a point outside of said hub for setting the predetermined speed for operation of said speed responsive means.

12. A controllable pitch propeller comprising a hub supporting a plurality of blades, an electric motor carried by the inboard portion of said hub with respect to said blades for varying the pitch of said blades when said hub is at rest, means for driving said blades from said motor, means for reversing said driving means, speed responsive means carried by said hub to control the operation of said motor at a predetermined propeller speed, and means controllable from a point outside of said hub for setting the predetermined speed for operation of said speed responsive means.

13. A controllable pitch propeller comprising a hub supporting a plurality of blades, electromagnetic means carried by the inboard portion of said hub with respect to said blades for varying the pitch of said blades when said hub is at rest, means for driving said blades from said electromagnetic means, means for reversing said driving means, speed responsive means carried by said hub to actuate said reversing means at a predetermined propeller speed, and means controllable from a point outside of said hub for setting the predetermined speed for operation of said speed responsive means.

14. A controllable pitch propeller comprising a hub supporting a plurality of blades, electromagnetic means carried by the inboard portion of said hub with respect to said blades for varying the pitch of said blades when said hub is at rest, reversible gearing connecting said motor and blades, speed responsive means carried by said hub to reverse said gearing at a predetermined propeller speed, and means controllable from a point outside of said hub for setting the predetermined speed for operation of said speed responsive means.

THOMAS A. DICKS.

CERTIFICATE OF CORRECTION.

Patent No. 2,291,953. August 4, 1942.

THOMAS A. DICKS.

It is hereby certified that error appears in the printed specification of the above numbered patent requiring correction as follows: Page 3, first column, line 38, for "194" read --184--; page 4, second column, line 36, claim 1, before "said" insert --the first--; page 5, first column, line 19, claim 7, for "ptch" read --pitch--; line 37, claim 8, for "a which" read --at which--; and second column, lines 43 and 44, claim 14, for "electromagnetic means" read --an electric motor--; and that the said Letters Patent should be read with this correction therein that the same may conform to the record of the case in the Patent Office.

Signed and sealed this 8th day of September, A. D. 1942.

(Seal)

Henry Van Arsdale,
Acting Commissioner of Patents.